United States Patent [19]
Nio et al.

[11] Patent Number: 5,627,602
[45] Date of Patent: May 6, 1997

[54] SIGNAL PROCESSING APPARATUS FOR PLURAL KINDS OF VIDEO SIGNALS

[75] Inventors: Yutaka Nio, Osaka; Yosuke Izawa, Ibaraki, both of Japan

[73] Assignee: Matsushita Electric Industrial Co., Ltd., Osaka, Japan

[21] Appl. No.: 382,908

[22] Filed: Feb. 3, 1995

[30] Foreign Application Priority Data

Feb. 4, 1994 [JP] Japan .................................. 6-012468

[51] Int. Cl.⁶ .................................................. H04N 5/268
[52] U.S. Cl. ........................ 348/705; 348/718; 348/558
[58] Field of Search ................................ 348/553–558, 348/563, 564, 460, 465, 467, 468, 714, 715, 716, 705, 706; 364/200; H04N 5/46, 5/268

[56] References Cited

U.S. PATENT DOCUMENTS

| | | | |
|---|---|---|---|
| 4,780,812 | 10/1988 | Freestone et al. | 364/200 |
| 4,954,882 | 9/1990 | Kamemoto | 348/468 |
| 4,980,765 | 12/1990 | Kudo et al. | 348/716 |
| 5,182,644 | 1/1993 | Kimata et al. | |
| 5,186,575 | 2/1993 | Lim | 348/555 |
| 5,298,995 | 3/1994 | Monta et al. | |
| 5,365,276 | 11/1994 | Imai et al. | 348/556 |
| 5,386,236 | 1/1995 | Hong | 348/556 |

FOREIGN PATENT DOCUMENTS

| | | |
|---|---|---|
| 0540077 | 5/1993 | European Pat. Off. . |
| 0546880 | 6/1993 | European Pat. Off. . |
| 2-179080 | 7/1990 | Japan . |
| WO93/09635 | 5/1993 | WIPO . |

OTHER PUBLICATIONS

European Search Report No. 95300651.7, dated Sep. 28, 1995.
Translation of "Multidimensional Signal Processing of Television Image", Toshihiko Fukinuke, Daily Industry Press Co., Fig. 4. 14, p. 137.

*Primary Examiner*—Michael Lee
*Attorney, Agent, or Firm*—Ratner & Prestia

[57] ABSTRACT

A video signal processing apparatus processes plural kinds of video signals and is used for displaying each one of the processed outputs of the plural kinds of video signals on the same screen. In the video signal processing apparatus, a memory used for a subtitle processing circuit and a memory used for a helper signal separation circuit are used in common by providing a switching means to switch according to an input video signal. A subtitle processing circuit magnifies a video signal with a letter box format such that a horizontally long picture is inserted in a picture with a 4:3 aspect ratio on a horizontally long screen with 2:1 or 16:9 aspect ratio. The helper signal separation circuit is used for receiving a television signal such as an EDTV 2 system which has a helper signal to improve picture quality.

13 Claims, 4 Drawing Sheets

SIGNAL PROCESSING APPARATUS FOR PLURAL KINDS OF VIDEO SIGNALS

BACKGROUND OF THE INVENTION

The present invention relates to a video signal processing apparatus which processes plural kinds of video signals and is used when each processed video signal is displayed on the same display device. In particular, it relates to a subtitle processing circuit for magnifying a video signal with a letter box format which displays a horizontally long picture on a screen with a 4:3 aspect ratio into a video signal corresponding to a horizontal long screen having an aspect ratio such as 2:1 or 16:9 and a separation circuit for a helper signal such as a horizontal high frequency band helper signal used in a television system, such as an EDTV 2 system having a helper signal for picture quality improvement.

Recently, besides television systems such as an NTSC system and a PAL system which are now practical and used worldwide, various kinds of television systems which are compatible with the current television systems and have improved resolution and S/N ratios, such as the EDTV (Enhanced Definition TeleVision) 1 system, the EDTV 2 system which is a second generation system of the EDTV system, the IDTV (Improved Definition TeleVision) system, the Improved PAL, the Extended PAL, etc., have been practically used or experimented. Because these new television systems are fundamentally compatible with a current television system, television receivers have to be able to receive signals of plural kinds of television systems.

An example of a television system which has no compatibility with the current above-listed television systems and has high performance is the HDTV (High Definition TeleVision) system. However, receivers for the HDTV system are presumed to be in a transient existence as single system receivers or to function to receive a signal of a current television system besides an HDTV system.

Thus, it will be desired more and more in the future that pictures from various different types of television systems are displayed on the same screen.

It is necessary to convert video signals for various different kinds of television systems into a video signal which can be displayed in common on a screen with an aspect ratio based on one of the television systems. One of the problems, in this case, is the signal conversion of television systems with different aspect ratios.

Figure 5A:
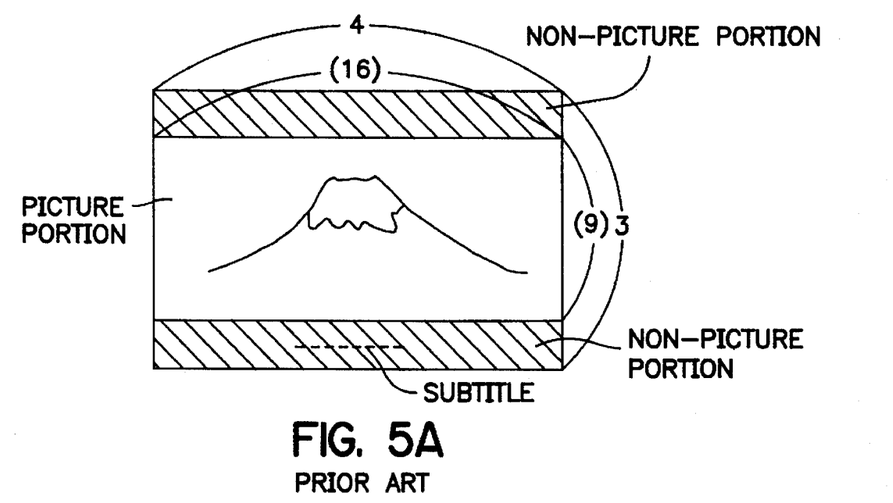
FIGS. 5(a) and (b) (Prior Art) illustrate displayed pictures on a screen.
Figure 5B:
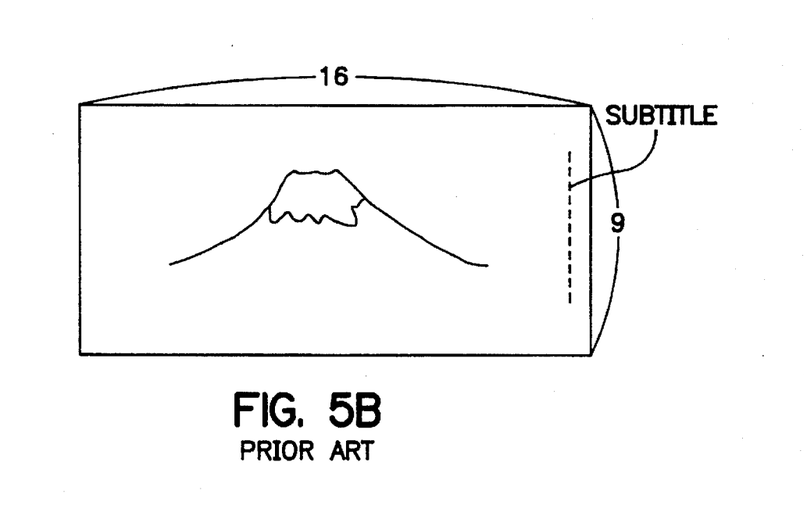

In the case in which a video signal with a 16:9 aspect ratio is displayed on a screen with a 4:3 aspect ratio, for example, a video signal is often converted so that non-picture portions are generated at the upper and lower portions of the raster (this format is called "letter box") as shown in FIG. 5(a) and the non-picture portions are used for superimposing a subtitle. When a video signal with such a letter box format is displayed on a horizontally long screen with a 16:9 aspect ratio as shown in FIG. 5(b), if the raster is magnified so that the picture portion fills the screen, the subtitle may be off the screen. Therefore, a subtitle processing circuit which moves the subtitle position as shown in FIG. 5(b) by storing subtitle information in a memory is proposed, for example, in Japanese Patent Laid-Open 2-179080.

In this case, although the memory has to store all the video signal including the subtitle information, because the subtitle is located on the non-picture portion at the lower half of the picture, it is necessary to store a maximum of 910 pixels at 4 fsc (fourfolds of subcarrier frequency) for about 130 lines at the lower half portion of the picture. That is, 910 (number of pixels per line)×130 (number of lines)×8 (number or gradation)=946,400 bits=about 1 M bits is required as memory capacity.

Usually in television systems such as the EDTV 2 and the Extended PAL systems, a helper signal which is necessary to improve the resolution is usually multiplexed and is demodulated at a receiver side and is used for improving the resolution. For example, in an EDTV 2 system, a horizontal high frequency band helper signal for improving horizontal resolution, utilizing a frequency gap on the position which is symmetrical to a chrominance signal band, is multiplexed on a video signal and transmitted.

Figure 4:
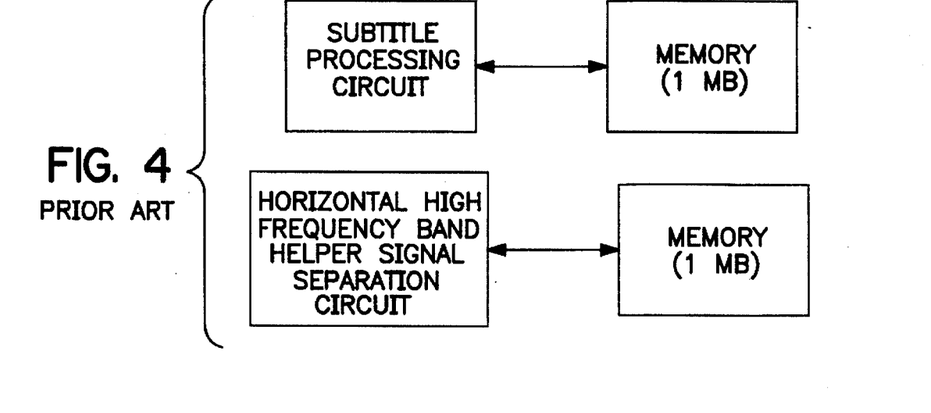
FIG. 4 is a block diagram of a signal processing apparatus in accordance with the present invention.

It is generally necessary to use a memory to separate such a helper signal at the receiver side. It is also necessary to use a memory to separate a horizontal high frequency band helper signal of an EDTV 2 system at the receiver side. For example, a circuit of this type is shown in FIGS. 4 and 14 on page 137 of "Multidimensional Signal Processing of Television Image" by Toshihiko Fukinuke, published by Daily Industry Press Co. In this case, the memory has to store all the video signal as one field color signal. Therefore, 455 (number of pixels per line)×262.5 (number of lines)×8 (number of gradations)=955,500 bits=about 1 M bits is required as memory capacity.

Therefore, two memories, a memory for a subtitle processing circuit and a memory for a horizontal high frequency band helper signal separation circuit, are required.

SUMMARY OF THE INVENTION

For an EDTV 2 signal having a 16:9 aspect ratio, a screen with a 16:9 aspect ratio is used. When a video signal with a letter box format is received at a receiver having a screen with an aspect ratio horizontally longer than 4:3, if only the picture portion is magnified and displayed as described above, the picture-portion can be more displayed. Therefore, means to magnify and display only a picture portion is often used.

However, to realize magnifying and displaying the picture portion, both helper signal processing for improving picture quality and subtitle processing are required and it is required to use two memories, each with about 1 M bits, as described above. However, this method is economically inferior because of the problem of expensive memories.

The present invention presents a video signal processing apparatus which can use a memory in common for subtitle processing and for helper signal processing to improve picture quality of a particular television system in question by switching.

To solve the above problem, a video signal processing apparatus in accordance with an exemplary embodiment of the present invention includes a memory which can read and write;

a first video signal processing circuit for processing a video signal using the memory;

a first three state bus transceiver for selecting an input or output signal of the first video signal processing circuit by a first switching signal;

a second video signal processing circuit for processing a video signal using the memory;

a second three state bus transceiver for selecting an input or output signal of the second video signal processing circuit by a second switching signal; and a switching circuit for generating the first switching signal and the second switching signal; and wherein the input and the output terminals of the first and the second three state bus transceivers are connected to the input and the output terminals of the memory.

The present invention can use a memory in common for the first and second processing which have to process a video signal using a memory and has a feature in the switching condition and the timing.

Another video signal processing apparatus in accordance with another exemplary embodiment of the present invention includes a memory for storing a video signal, a first video signal processing circuit for processing the video signal using the memory, a first bidirectional switching device for connecting an input or output signal of the first video signal processing circuit to the input and the output terminals of the memory, a second video signal processing circuit for processing a second video signal of the input video signal using the memory, a second bidirectional switching device for connecting an input output signal of the second video signal processing circuit to the input and the output terminals of the memory, and a control circuit for controlling the first and the second bidirectional switching devices, and wherein the control circuit controls turning on and off of the first and the second bidirectional switching devices according to the video signal.

The first video signal processing circuit is a subtitle processing circuit for moving a subtitle, the second video signal processing circuit is a separation circuit for separating a discrimination signal which can discriminate if a helper signal for improving picture quality is included in the input video signal or hot, the control circuit provides video signal discrimination means for discriminating what kind of video signal the input video signal is, when the video signal includes a discrimination signal the first bidirectional switching means is made off and the second bidirectional switching means is made on, when the video signal does not include a discrimination signal, the first bidirectional switching means is made on and the second bidirectional switching means is made off.

Thus, the video signal is appropriately processed for the video signal and the memory capacity can be reduced.

The video signal processing apparatus includes a memory for storing a video signal, a first video signal processing circuit for processing a first video signal using the memory, a first bidirectional switching device for connecting an input or output signal of the first video signal processing circuit to the input and the output terminals of the memory, a second video signal processing circuit for processing video signal of the input video signal using the memory, a second bidirectional switching device for connecting an input or output signal of the second video signal processing circuit to the input and the output terminals of the memory, and a control circuit for controlling the first and second bidirectional switching devices, and display means for displaying the outputs of the first and the second video signal processing circuits; and wherein the control circuit controls turning on and off of the first and the second switching means according to the comparison result between and aspect ratio of the video signal and aspect ratio of a screen of the display means.

Thus, the aspect ratio of the screen and the aspect ratio of the video signal are compared and whether a picture signal part is magnified and displayed or not is determined according to the compared result and processing appropriate to the content of the video signal is realized by a reduced memory capacity.

One memory can be used in common by switching between the first video signal processing circuit and the second video signal processing circuit by generating a first switching signal and a second switching signal at a switching circuit, selecting an input terminal or an output terminal of the first video signal processing circuit through the first three state bus transceiver by the first switching signal, selecting an input terminal or an output terminal of the first video signal processing circuit through the second three state bus transceiver by the second switching signal, and connecting the input and output terminals at the memory sides of the first and the second three state bus transceivers to the output and the input terminals of the memory.

DETAILED DESCRIPTION OF THE INVENTION

Figure 1:
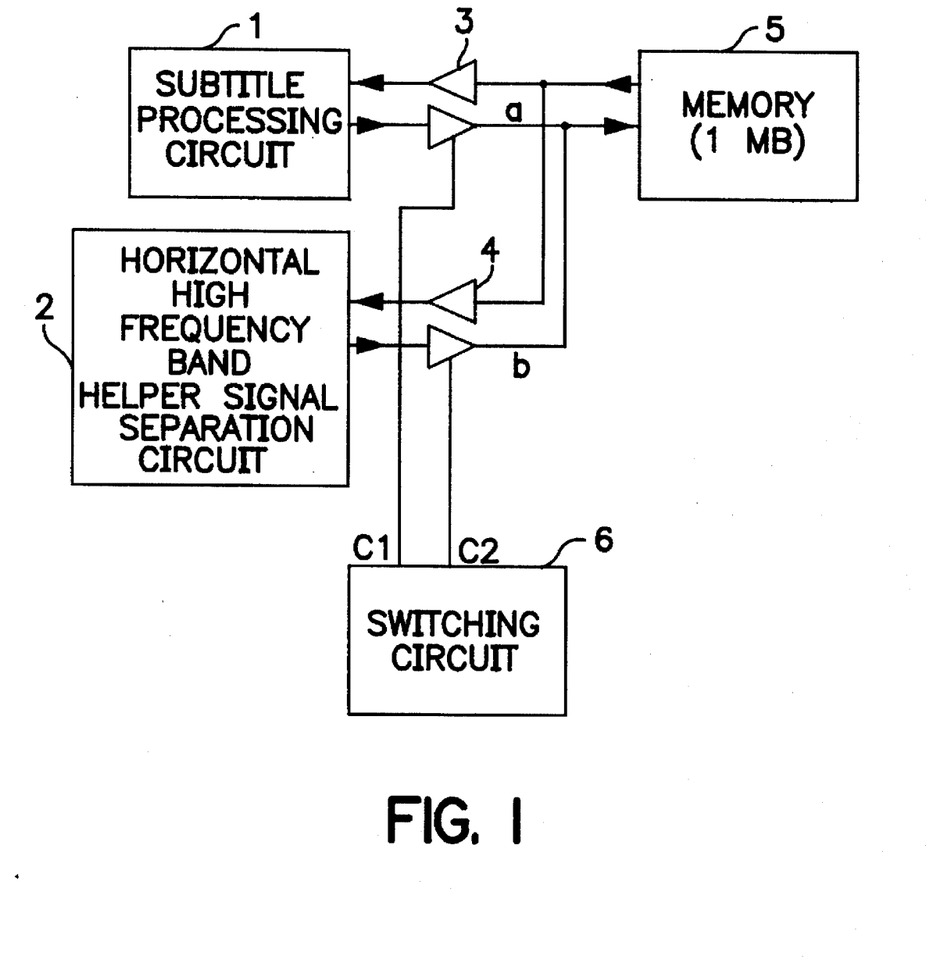
FIG. 1 is a block diagram of a signal processing apparatus for plural kinds of video signals in accordance with an exemplary embodiment of the present invention.

A block diagram of a signal processing apparatus for plural kinds of video signals in accordance with an exemplary embodiment of the present invention is shown in FIG. 1. The television receiver provides video signal input terminals for current television signal such as the NTSC system and the PAL system and for several television signals which are now under development for improving picture quality of the current television systems such as the EDTV 1 system, the EDTV 2 system, the IDTV system, and the Improved PAL system, although they are not shown in the drawing.

In FIG. 1, the block 1 is a subtitle processing circuit for moving a subtitle, the block 2 is a horizontal high frequency band helper signal separation circuit for separating a horizontal high frequency band helper signal which is a helper signal multiplexed for improving picture quality, the block 3 is a first three state bus transceiver for selecting an input or output signal of the subtitle processing circuit 1 by a switching signal C1, the block 4 is a second three state bus transceiver for selecting an input or output signal of the horizontal high frequency band helper signal separation circuit 2 by a switching signal C2, the block 5 is a memory for storing output of either the first or second three state bus transceiver 3 or 4 and the block 6 is a switching circuit for generating switching signals C1 and C2.

Performance of the signal processing apparatus for plural kinds of video signals is explained with an example of a screen having a 16:9 aspect ratio used in an EDTV 2 system.

In the case of the current NTSC system or the PAL system, a video signal is often transmitted with a letter box format having a signal with a horizontally long aspect ratio such as 16:9 and having a non-picture portion signal at the upper and lower portions of the screen and having no horizontal high frequency band helper signal which is a helper signal for improving picture quality. On the other hand, in the case of the EDTV 2 system, the IDTV system, the Improved PAL system or the Extended PAL system which are being developed for improving picture quality, the video signal is usually transmitted with a format having a signal with a horizontally long aspect ratio such as 16:9 and having no non-picture signal and having a horizontal high frequency band helper signal which is a helper signal for improving picture quality.

Therefore, a discrimination signal indicating if there is a helper signal for improving picture quality in the input signal is detected by using means for discriminating kind of video signal (not shown in the drawing) and detects if a horizontal high frequency band helper signal is multiplexed in the input video signal or not. When a horizontal high frequency band helper signal is confirmed not to be multiplexed in the input video signal, a switching signal C1 is set to level 0 (enable) and another switching signal C2 is set to level 1 (disable) by a switching circuit 6 so that subtitle processing is performed. Thus, because processing of the horizontal high frequency band helper signal is unnecessary, a three state bus transceiver 4 is controlled to have a high impedance. A three state bus transceiver 3 is controlled to have a low impedance because processing of the subtitle signal is necessary, an output of a subtitle processing circuit 1 is written in a memory 5 passing through the three state bus transceiver 3 and the output of the memory 5 is read at the subtitle processing circuit 1. By this processing, only the picture portion is magnified and is displayed on the screen with a 16:9 aspect ratio and the subtitle located on the non-picture portion is moved to an appropriate position and is displayed. As a result, subtitles can be displayed appropriately and a larger picture display can be realized.

In the case of a system such as the EDTV 2, because a horizontal high frequency band helper signal is multiplexed, by detecting the horizontal high frequency band helper signal, the switching signal C1 is set to level 1 (disable) and the switching signal C2 is set to level 0 (enable) by the switching circuit 6 so that the horizontal high frequency band helper signal is separated.

Thus, because subtitle processing is unnecessary, the three state bus transceiver 3 is controlled to have a high impedance.

On the other hand, because processing of a horizontal high frequency band helper signal is necessary, the three state bus transceiver 4 is controlled to have a low impedance, an output of the horizontal high frequency band helper signal separation circuit 2 is written in the memory 5 passing through the three state bus transceiver 4 and an output of the memory 5 is read at the horizontal high frequency band helper signal separation circuit 2. By this processing, horizontal resolution is improved and this is one of features of an EDTV 2 system.

Figure 2A:
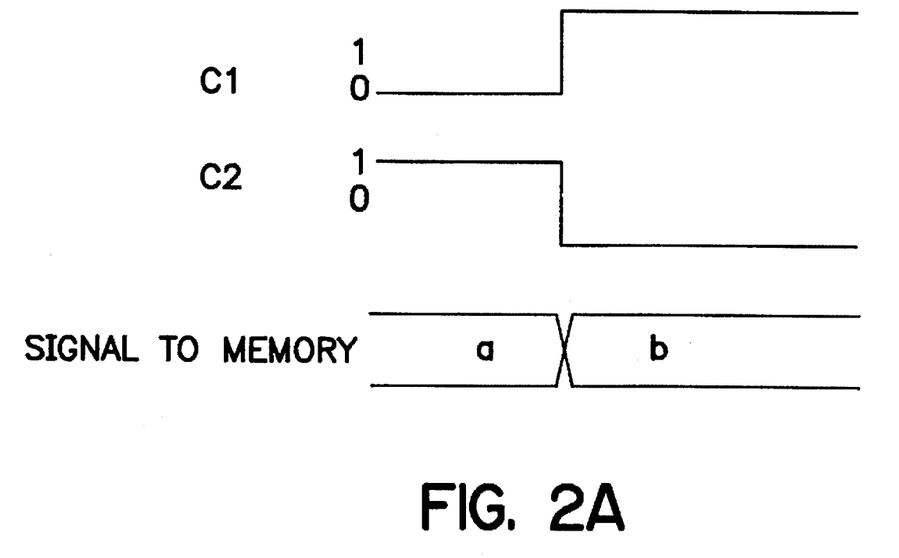
FIGS. 2(a) and (b) are timing charts for explaining the performance of a signal processing apparatus for plural kinds of video signals in accordance with an exemplary embodiment of the present invention.
Figure 2B:
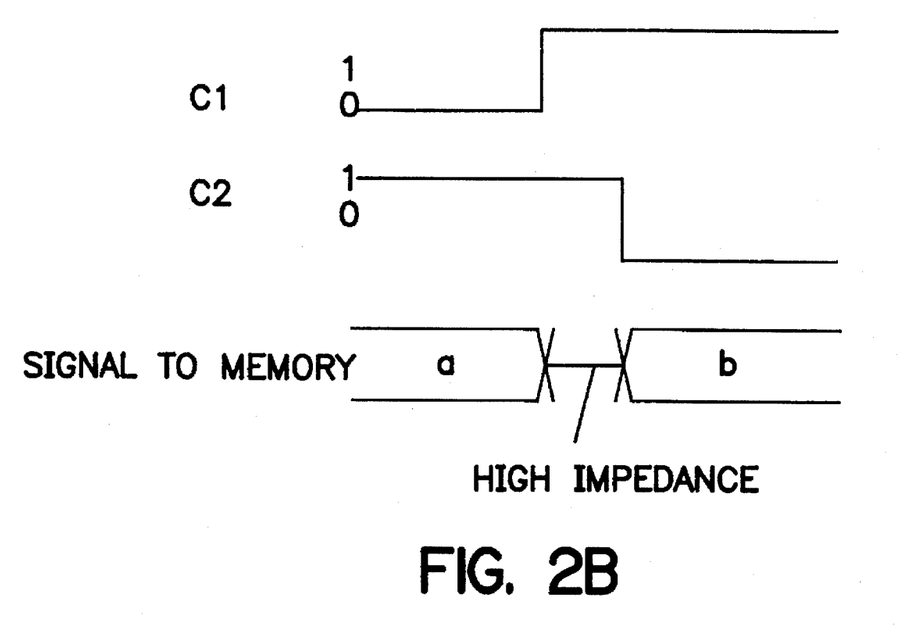

The signals are illustrated in FIG. 2(a). Here, "a" is defined as the input and output signals of the three state bus transceiver 3 and "b" is defined as the input and output signals of the three state bus transceiver 4. If the video signal is difficult to see due to switching timing, a period during which both switching signals C1 and C2 are set to level 1 (disabled) is used, as shown in FIG. 2 (b).

Although an example to detect a discrimination signal was described above as means for discriminating what kind of video signal is present, it is also possible to detect a non-picture portion of the input video signal by detecting if a white signal exists at every horizontal line and black signal continuously exists and determine if the input video signal is a signal with a letter box format or not. It is also possible to detect if the input video signal has a subtitle signal or not by detecting if the input video signal has a letter display on the non-picture portion. By detecting this, memory switching can be done more appropriately and the circuit group which is not necessary to perform can be automatically stopped and, at the same time, the power consumption can be reduced.

In the case of a video signal including a helper signal for improving picture quality, processing by the horizontal high frequency band helper signal separation circuit 2 is desired. In the case of a video signal not including a helper signal, processing by the subtitle processing circuit 1 is not always desired. The subtitle processing circuit 1 is allowed to perform but what is desired is a signal with a letter box format and it is restricted to the case in which a subtitle exists.

Although a three state bus transceiver was used as switching means of the memory 5, bidirectional switching means can be used to yield a similar effect. Although a switching circuit 6 was used as a control circuit of the switching means, any device having a bidirectional performance to control the switching means according to the kind of input video signal can be used to yield a similar effect.

Figure 3:
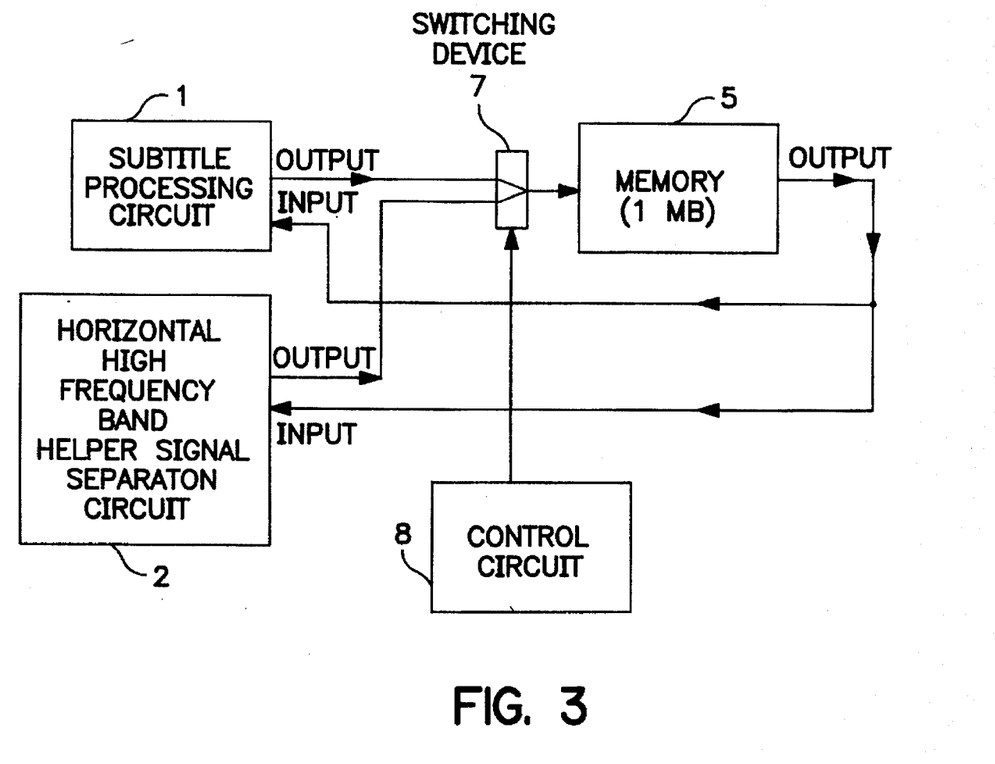
FIG. 3 is a block diagram of a signal processing apparatus for plural kinds of video signals in accordance with anther exemplary embodiment of the present invention.

A block diagram of a signal processing apparatus for plural kinds of video signals in accordance with another exemplary embodiment of the present invention is shown FIG. 3.

In FIG. 3, the television receiver provides video signal input terminals for current television signals such as the NTSC system and the PAL system and for several television signals which are now under development for improving the picture quality of the current television systems such as the EDTV 1 system, the EDTV 2 system, the IDTV system, and the Improved PAL system, although they are not shown in the drawing like in FIG. 1.

In FIG. 4, the block 1 is a subtitle processing circuit for moving a subtitle, the block 2 is a horizontal high frequency band helper signal separation circuit for separating a horizontal high frequency band helper signal which is a helper signal multiplexed for improving picture quality, the block 5 is a memory and the above blocks are similar to those in FIG. 1. The block 7 is a switching device and the outputs of the subtitle processing circuit 1 and the horizontal high frequency band helper signal separation circuit 2 are inputted to the switching device 7 and the output of the switching device 7 is inputted to the memory 5. The block 8 is a control circuit for detecting a discriminating signal to judge if a horizontal high frequency band helper signal for improving picture quality is multiplexed or not using means (not shown in the drawing) to determine what kind of video signal the input video signal is and for controlling the switching device 7 according to the determination result.

A read output of a memory 5 is inputted directly (without the use of a switch) to the subtitle processing circuit 1 and the horizontal high frequency band helper signal separation circuit 2.

The switch 7 is switched according to the content, of the input video signal in a manner similar to the previous exemplary embodiment. When the subtitle processing circuit 1 is to be used, subtitle processing is made using the memory 5 through the switch 7 and when the horizontal high frequency band helper signal separation circuit 2 is to be used, helper signal processing is made using the memory 5 through the switch 7. Thus, the memory 5 can be used in common and processing which is appropriate to the input video signal is made.

Although a current NTSC system and an EDTV 2 system which has a helper signal for improving picture quality and is compatible with the current NTSC system were described above, an HDTV system which is not compatible presents a similar effect when the HDTV signal is displayed with signal switching, because the signal processing requires a memory particular to the system.

According to a video signal processing apparatus in accordance with exemplary embodiments of the present invention, the memory capacity to be used can be reduced by detecting the features of the input video signals against plural kinds of input video signals and selecting which group of video signal processing circuits is to perform. In an EDTV system receiver providing a video signal processing apparatus in accordance with the present invention, when a signal with a letter box format is inputted, a first video signal processing circuit (for example, a subtitle processing circuit) is selected and the video signal is processed using a memory and when an EDTV 2 signal is inputted, a second video signal processing circuit (for example, a horizontal high frequency band helper signal separation circuit) is selected and the video signal can be processed using the same memory by switching. Thus, a remarkable cost reduction can be realized by reducing the memory capacity.

The invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed:

1. A signal processing apparatus for plural kinds of video signals comprising:

memory means which can read and write;

first video signal processing means for processing a first video signal, which is included in a composite video signal, using said memory means;

first three state bus transceiver means for selecting an input signal and an output signal of said first video signal processing means by a first switching signal;

second video signal processing means for processing a second video signal included in the composite video signal using said memory means;

second three state bus transceiver means for selecting an input signal and an output signal of said second video signal processing means by a second switching signal;

discrimination means for discriminating the first video signal and the second video signal and forming a discrimination result therefrom; and control means for receiving the discrimination result and for generating said first switching signal and said second switching signal based on the discrimination result;

wherein said first three state bus transceiver means and said second three state bus transceiver means are connected to said memory means.

2. A signal processing apparatus for plural kinds of video signals as recited in claim 1, wherein said first video signal processing means is a subtitle processing means for moving a subtitle position; and said second video signal processing means is a horizontal high frequency band helper signal separation means for separating a horizontal high frequency band helper signal.

3. A signal processing apparatus for plural kinds of video signals comprising:

memory means for storing an input video signal comprising at least a first video signal and a second video signal;

first video signal processing means for processing the first video signal using said memory means;

first bidirectional switching means adapted to provide an input or output signal between said first video signal processing means and said memory means;

second video signal processing means for processing the second video signal using said memory means;

second bidirectional switching means adapted to provide an input or output signal between said second video signal processing means and said memory means;

discrimination means for discriminating the first video signal and the second video Signal in said input video signal and for forming a discrimination result therefrom; and control means for receiving the discrimination result and for controlling said first bidirectional switching means and said second bidirectional switching means based on the discrimination result;

wherein said control means controls turning on and off of said first bidirectional switching means and said second bidirectional switching means according to the input video signal.

4. A signal processing apparatus for plural kinds of video signals comprising:

memory means for storing an input video signal comprising at least a first video signal and a second video signal;

first video signal processing means for processing the first video signal using said memory means;

first switching means adapted to provide an output signal of said first video signal processing means to said memory means;

second video signal processing means for processing the second video signal using said memory means;

second switching means adapted to provide an output signal of said second video signal processing means to said memory means;

control means for controlling said first switching means and said second switching means, wherein:

said memory is adapted to provide an output signal to said first video signal processing means and said second video signal processing means;

said control means controls turning on and off of said first switching means and said second switching means according to the input video signal;

said first video signal processing means is subtitle processing means for moving a subtitle position;

said second video signal processing means is separation means for separating a helper signal for improving picture quality;

said control means provides a video signal discrimination means for discriminating kind of the input video signal, wherein:

when said video signal discrimination means discriminates that the input video signal includes a discrimination signal to judge if the helper signal for improving picture quality is present or not, the first switching means is made off and the second switching means is made on, and when said video signal discrimination means discriminates that the input video signal does not include the discrimination signal, said first switching means is made on and said second switching means is made off.

5. A signal processing apparatus for plural kinds of video signals as recited in claim 4, wherein:

when said video signal discrimination means discriminates that the input video signal includes a horizontal high frequency band helper signal, said first switching means is made off and said second switching means is made on, and when said video signal discrimination means discriminates that the input video signal does not include the horizontal high frequency band helper signal, said first switching means is made on and said second switching means is made off.

6. A signal processing apparatus for plural kinds of video signals as recited in claim 4, wherein:

when said video signal discrimination means discriminates that the input video signal includes a horizontal high frequency band helper signal, said first switching means is made off and said second switching means is made on, when said video signal discrimination means discriminates that the input video signal does not include the horizontal high frequency band helper signal and includes a subtitle signal, said first switching means is made on, said subtitle processing means is driven, and said second switching means is made off, and when said video signal discrimination means discriminates that the input video signal does not include both the horizontal high frequency band helper signal and the subtitle signal, said first switching means is made on, said subtitle processing means is stopped, and said second switching means is made off.

7. A signal processing apparatus for plural kinds of video signals as recited in claim 4, wherein:

said control means provides letter box discrimination means for discriminating if the input video signal is a signal with a letter box format having non-picture portions at the upper and lower portions of the picture or not; and wherein:

when it is judged that the input video signal includes a horizontal high frequency band helper signal, said first switching means is made off and said second switching means is made on;

when it is judged that the input video signal does not include the horizontal high frequency band helper signal and has the letter box format, said first switching means is made on, said subtitle processing means is driven, and said second switching means is made off; and when it is judged that the input video signal does not include the horizontal high frequency band helper signal and does not have the letter box format, said subtitle processing means is stopped and said second switching means is made off.

8. A signal processing apparatus for plural kinds of video signals as recited in claim 4, wherein:

said control means provides letter box discrimination means for discriminating if the input video signal is a signal with a letter box format having non-picture portions at the upper and lower portions of the picture or not; and wherein:

when it is judged that the input video signal includes a horizontal high frequency band helper signal, said first switching means is made off and said second switching means is made on;

when it is judged that the input video signal does not include the horizontal high frequency band helper signal and includes a subtitle signal and has the letter box format, said first switching means is made on, said subtitle processing means is driven, and said second switching means is made off; and when it is judged that the input video signal includes neither the horizontal high frequency band helper signal nor the subtitle signal and has the letter box format, or when it is judged that the input video signal does not include the horizontal high frequency band helper signal and does not have the letter box format, said subtitle processing means is stopped and said second switching means is made off.

9. A signal processing apparatus for plural kinds of video signals comprising:

memory means for storing an input video signal comprising at least a first video signal and a second video signal;

first video signal processing means for processing the first video signal using said memory means;

first bidirectional switching means adapted to provide an input and output signal between said first video signal processing means and said memory means;

second video signal processing means for processing the second video signal using said memory means;

second bidirectional switching means adapted to provide an input and output signal between said second video signal processing means and said memory means;

discrimination means for discriminating the first video signal and the second video signal and for forming a discrimination result therefrom; and control means for receiving the discrimination result and for controlling said first bidirectional switching means and said second bidirectional switching means based on the discrimination result;

wherein said control means controls turning on and off said first bidirectional switching means and said second bidirectional switching means responsive to an aspect ratio of the input video signal.

10. A signal processing apparatus for plural kinds of video signals comprising:

memory means for storing an input video signal comprising at least a first video signal and a second video signal;

first video signal processing means for processing the first video signal using said memory means;

first switching means adapted to provide an output signal of said first video signal processing means to said memory means;

second video signal processing means for processing the second video signal using said memory means;

second switching means adapted to provide an output signal of said second video signal processing means to said memory means;

discrimination means for discriminating the first video signal and the second video signal and for forming a discrimination result therefrom; and control means for receiving the discrimination result and for controlling said first switching means and said second switching means based on the discrimination result; and wherein:

said memory is adapted to provide an output signal to said first video signal processing means and said second video signal processing means; and said control means controls turning on and off said first switching means and said second switching means responsive to an aspect ratio of the input video signal.

11. A signal processing apparatus for plural kinds of video signals as recited in claim 3, 6, 9 or 10, wherein:

said control means controls to have a period to turn off both said first switching means and said second switching means, when said first switching means and said second switching means are switched on and off.

12. A signal processing apparatus for plural kinds of video signals as recited in claim 1, wherein the first video signal processing means processes a first helper signal included in said composite video signal and the second video signal processing means processes a second helper signal included in said composite video signal.

13. A signal processing apparatus for plural kinds of video signals as recited in claim 1, wherein:

said control means controls to have a period to turn off both said first three state bus transceiver means and said second three state bus transceiver means, when said first three state bus transceiver means and said second three state bus transceiver means are switched on and off.

* * * * *

UNITED STATES PATENT AND TRADE MARK OFFICE
CERTIFICATE OF CORRECTION

PATENT NO. : 5,627,602
DATED : May 6, 1997
INVENTOR(S) : Nio et al.

It is certified that error appears in the above-identified patent and that said Letters Patent is hereby corrected as shown below:

Column 8, line 33, "Signal" should be --signal--.

Column 8, line 62, "said memory..." should begin a new paragraph.

Column 11, line 21, delete "6" and insert --4--.

Signed and Sealed this

Twenty-eighth Day of October, 1997

*Attest:*

BRUCE LEHMAN

*Attesting Officer*     *Commissioner of Patents and Trademarks*